(12) United States Patent
Iwata

(10) Patent No.: US 6,198,771 B1
(45) Date of Patent: Mar. 6, 2001

(54) MOTION VECTOR PROCESSING CIRCUIT

(75) Inventor: Eiji Iwata, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/140,318

(22) Filed: Oct. 22, 1993

(30) Foreign Application Priority Data

Oct. 28, 1992 (JP) .................................................. 4-311163

(51) Int. Cl.⁷ .................................................. H04N 7/12
(52) U.S. Cl. ..................................... 375/240.16; 348/699
(58) Field of Search ........................... 348/412.1, 413.1, 348/416.1, 699, 700, 390.1; 375/240.16; 382/236, 238

(56) References Cited

U.S. PATENT DOCUMENTS

| | | | |
|---|---|---|---|
| 4,722,003 | 1/1988 | Kondo ................................... | 348/421 |
| 4,729,021 | 3/1988 | Kondo ................................... | 348/421 |
| 4,845,560 | 7/1989 | Kondo et al. ......................... | 348/416 |
| 4,897,720 | * 1/1990 | Wu et al. .............................. | 348/412 |
| 4,937,666 | * 6/1990 | Yang ..................................... | 348/413 |
| 5,023,710 | 6/1991 | Kondo et al. ......................... | 348/421 |
| 5,173,771 | 12/1992 | Kitazato ................................ | 348/416 |
| 5,235,536 | * 8/1993 | Matsubishi et al. ................. | 364/736 |

FOREIGN PATENT DOCUMENTS

| | | | |
|---|---|---|---|
| 0488795 | 6/1992 | (EP) ................................ | G06F/15/70 |
| 0497586 | 8/1992 | (EP) ................................ | G06F/15/70 |
| 0508706 | 10/1992 | (EP) ................................ | H04N/5/14 |
| 2257326 | 1/1993 | (GB) ................................ | H04N/5/14 |

OTHER PUBLICATIONS

"Array Architectures for Block Matching Algorithms", IEEE Transactions on Circuits and Systems, vol. 36, No. 10, Oct. 1989, pp. 1301–1308.*
"VLSI Architectures for Block Matching Algorithms", Komarck, Pince, © 1989 IEEE, pp. 2457–2460.*
"VLSI Architectures for the Fall–Search Blockmatching Algorithm", DeVos, Stegher, Noll, © 1989 IEEE, pp. 1687–1690.*
"Parameterizable VLSI Architectures for the Full–Search Block–Matching Algorithm", Devos & Steghenv, IEEE Trans. on Circuits & System, pp. 1309–1316.*

* cited by examiner

*Primary Examiner*—Vu Le
(74) *Attorney, Agent, or Firm*—Ronald P. Kananen; Rader, Fishman & Grauer

(57) ABSTRACT

A processing circuit for performing full searching by a block-matching method for detecting the motion vector, with a block size of a reference block of the current frame being for example, 3×4 pixels and the number of candidate blocks of a previous frame being 3×4. The processing includes 3×4 or 12 processing units each of which is adapted for accumulating an absolute value of the difference between the pixel value of the reference block of the current frame on one hand and the pixel value of a candidate block of an odd column of the previous frame and the pixel value of a candidate block of an even column of the previous frame, whichever is selected as a result of multiplication, on the other hand, to find the sum of the absolute values of the differences. These units are arrayed in a 3×4 matrix configuration and interconnected so as to be supplied with the pixel values of the reference block and the candidate blocks in a pre-set sequence to detect the motion vector.

6 Claims, 11 Drawing Sheets

FIG.1A
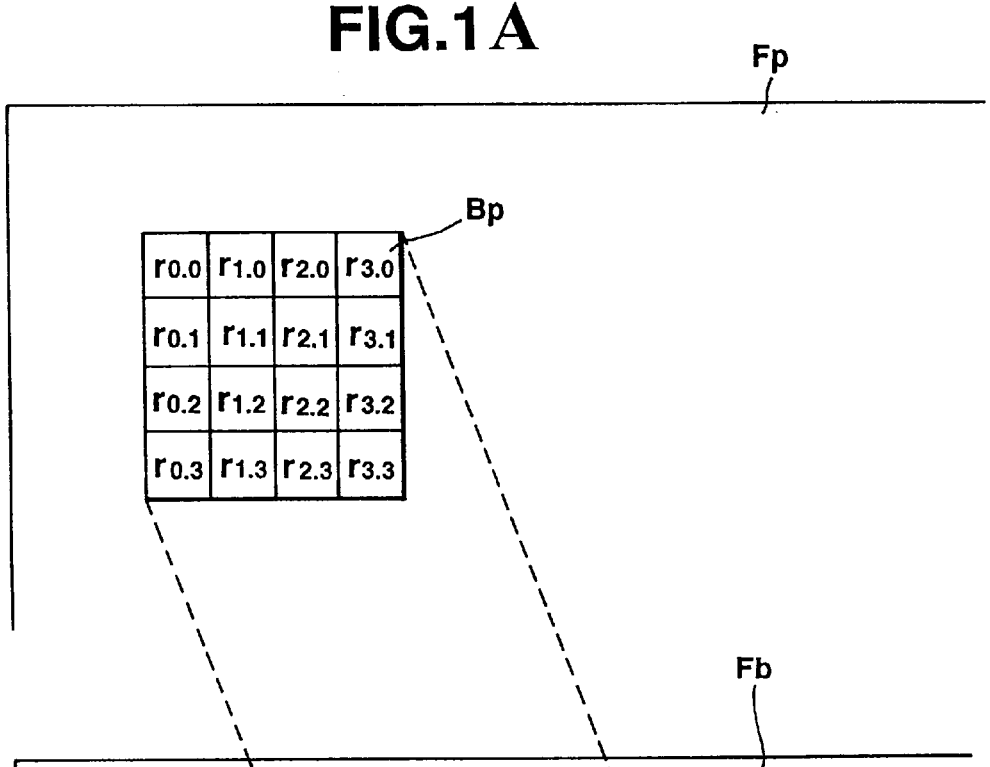
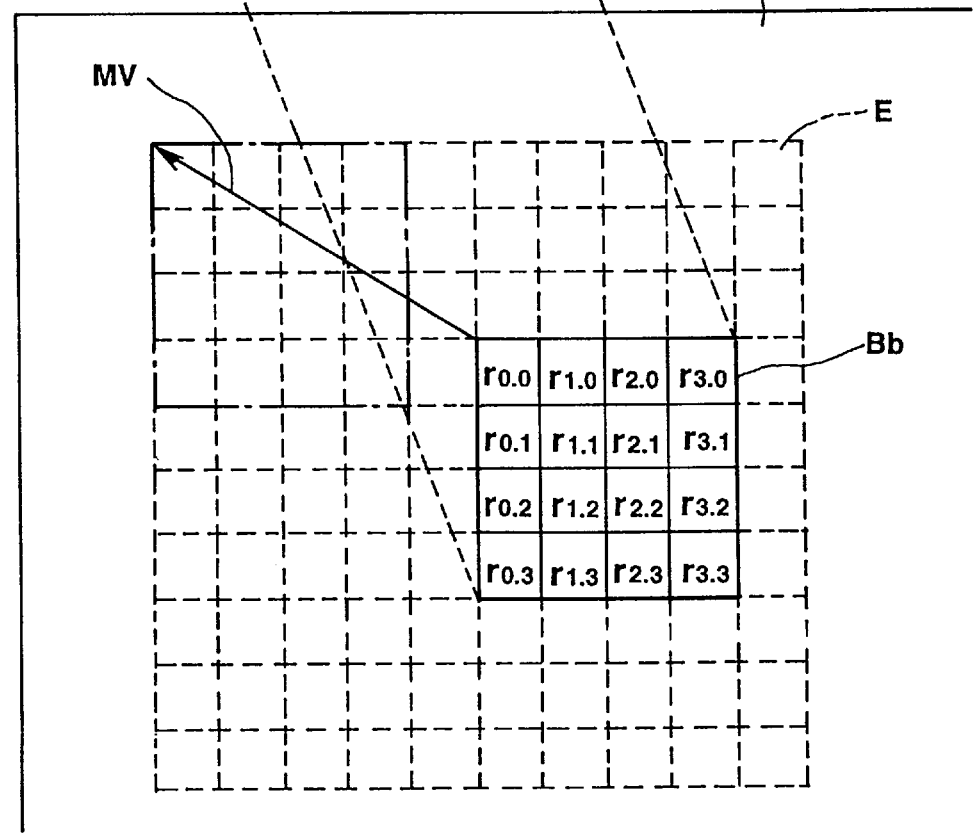
FIG.1B

|     | Bp0 |     |     | Bp1 |     |
|-----|-----|-----|-----|-----|-----|
| ra  | re  | ri  | ra' | re' | ri' |
| rb  | rf  | rj  | rb' | rf' | rj' |
| rc  | rg  | rk  | rc' | rg' | rk' |
| rd  | rh  | rl  | rd' | rh' | rl' |

Ep

|     | E0  |     |     | E1  |     |     |     |     |
|-----|-----|-----|-----|-----|-----|-----|-----|-----|
| C0  | C7  | C14 | C21 | C28 | C35 | C42 | C49 | C56 |
| C1  | C8  | C15 | C22 | C29 | C36 | C43 | C50 | C57 |
| C2  | C9  | C16 | C23 | C30 | C37 | C44 | C51 | C58 |
| C3  | C10 | C17 | C24 | C31 | C38 | C45 | C52 | C59 |
| C4  | C11 | C18 | C25 | C32 | C39 | C46 | C53 | C60 |
| C5  | C12 | C19 | C26 | C33 | C40 | C47 | C54 | C61 |
| C6  | C13 | C20 | C27 | C34 | C41 | C48 | C55 | C62 |

MOTION VECTOR PROCESSING CIRCUIT

BACKGROUND OF THE INVENTION

1. Field of the Invention

This invention relates to a processing circuit advantageously employed for detection and processing of a motion vector employed for picture compression and encoding in digital picture processing. More particularly, it relates to a processing circuit for detecting the motion vector by carrying out a full search by a block-matching method.

2. Description of Related Art

Among the methods previously employed for picture compression and encoding in processing digital picture signals, are the so-called block-matching method and the gradient method.

The block-matching method, extensively applied for motion compensation and prediction in compression and encoding of picture signals, is hereinafter explained.

First of all, a picture frame or field is divided into blocks, each usually having a block size of 8×8 or 16×16 pixels. Motion vector detection is the process of detecting the area of a previous frame from which an object block or reference block of a current frame has been moved. Specifically, motion vector detection is the operation of detecting a block bearing the strongest resemblance to the reference block Bp of the current frame Fp from a set of candidate blocks Bb within a search range E of the previous frame Fb and detecting a positional shift between the reference block Bp and the detected candidate block Bb as a motion vector, as shown for example in FIG. 1.

During motion vector detection, the block bearing the strongest resemblance to the reference block Bp is detected in the following manner.

As a first step, the difference between each pixel value of a given candidate block Bb and the corresponding pixel value of the reference block Bp is determined to create an evaluation value represented by the difference, for example, a sum of absolute values of the differences or a sum of the differences squared.

As a second step, the first step is performed for each of the candidate blocks Bb within the search range E and the one representing the least of the sums of the absolute values of the differences or the least of the sums of the differences squared is found. The candidate block Bb which gives the least value of the sums of the absolute values of the differences or the least of the sums of the differences squared is adopted as the block bearing the strongest resemblance to the reference block Bp.

Specifically, if the block size of the reference block Bp is M×N pixels, and the number of the candidate blocks Bb is K×L, the above-depicted motion vector detecting operation may be represented by the following equations (1) and (2):

$$D_{i,j} = \sum_{m=0}^{M-1} \sum_{n=0}^{N-1} |r_{m,n} - c_{m+i,n+j}| \quad 0 \le i < K, \; 0 \le j < L \quad (1)$$

$$MV_{x,y} = \min D_{i,j} \quad (2)$$

It is noted that the sum of the absolute value of the differences $D_{i,j}$ is found using the equation (1); not the sum of differences squared. In the equation (1), r and c represent the pixel value of the reference block Bp of the current frame, and previous frame, respectively.

Further, it is noted that (x, y) in the equation (2) mean the values of (i, j) which give the least sum of the absolute values of the differences ($\min D_{i,j}$). It is (x, y) in the equation (2) which represents the motion vector $MV_{x,y}$.

Consequently, in the above-depicted example of FIG. 1 in which the sum of the absolute values of the differences $D_{5,3}$ has the least sum value for the block size of the reference block Bp of 4×4 pixels and the number of the candidate blocks Bb of 7×7, the motion vector is given as (5, 3).

The conventional circuit arrangement for the above-mentioned motion vector detection will be hereinafter explained. First, by way of explaining the conventional circuit arrangement, an example of the operation of detecting the motion vector is explained. The conventional circuit arrangement and control system for this example will then be explained.

By way of an example, the operation of detecting the motion vector for the block size of the reference block Bp of 3×4 pixels and the number of the candidate blocks Bb of 3×4 is explained with reference to FIG. 2. In FIG. 2, the lowercase letters a, b, c ... are affixed as subscripts to the pixel values r of the reference block Bp of the current frame Fp ($r_a$, $r_b$, $r_c$, ... ), while numerals 0, 1, 2, ... are affixed as subscripts to the pixel values c of the previous frame Fb ($c_0$, $c_1$, $c_2$, ... ). The sequence of operations for detecting the motion vector is hereinafter explained with reference to FIG. 2.

As a first step, calculation of the following equations (3) to (14) is performed:

$$D_{0,0} = |r_a - c_0| + |r_b - c_1| + |r_c - c_2| + |r_d - c_3| + |r_e - c_7| + \ldots + |r_1 - c_{17}| \quad (3)$$

$$D_{0,1} = |r_a - c_1| + |r_b - c_2| + |r_c - c_3| + |r_d - c_4| + |r_e - c_8| + \ldots + |r_1 - c_{18}| \quad (4)$$

$$D_{0,2} = |r_a - c_2| + |r_b - c_3| + |r_c - c_4| + |r_d - c_5| + |r_e - c_9| + \ldots + |r_1 - c_{19}| \quad (5)$$

$$D_{0,3} = |r_a - c_3| + |r_b - c_4| + |r_c - c_5| + |r_d - c_6| + |r_e - c_{10}| + \ldots + |r_1 - c_{20}| \quad (6)$$

$$D_{1,0} = |r_a - c_7| + |r_b - c_8| + |r_c - c_9| + |r_d - c_{10}| + |r_e - c_{14}| + \ldots + |r_1 - c_{24}| \quad (7)$$

$$D_{1,1} = |r_a - c_8| + |r_b - c_9| + |r_c - c_{10}| + |r_d - c_{11}| + |r_e - c_{15}| + \ldots + |r_1 - c_{25}| \quad (8)$$

$$D_{1,2} = |r_a - c_9| + |r_b - c_{10}| + |r_c - c_{11}| + |r_d - c_{12}| + |r_e - c_{16}| + \ldots + |r_1 - c_{26}| \quad (9)$$

$$D_{1,3} = |r_a - c_{10}| + |r_b - c_{11}| + |r_c - c_{12}| + |r_d - c_{13}| + |r_e - c_{17}| + \ldots + |r_1 - c_{27}| \quad (10)$$

$$D_{2,0} = |r_a - c_{14}| + |r_b - c_{15}| + |r_c - c_{16}| + |r_d - c_{17}| + |r_e - c_{21}| + \ldots + |r_1 - c_{31}| \quad (11)$$

$$D_{2,1} = |r_a - c_{15}| + |r_b - c_{16}| + |r_c - c_{17}| + |r_d - c_{18}| + |r_e - c_{22}| + \ldots + |r_1 - c_{32}| \quad (12)$$

$$D_{2,2} = |r_a - c_{16}| + |r_b - c_{17}| + |r_c - c_{18}| + |r_d - c_{19}| + |r_e - c_{23}| + \ldots + |r_1 - c_{33}| \quad (13)$$

$$D_{2,3} = |r_a - c_{17}| + |r_b - c_{18}| + |r_c - c_{19}| + |r_d - c_{20}| + |r_e - c_{24}| + \ldots + |r_1 - c_{34}| \quad (14)$$

In performing these calculations, the pixel values r ($r_a$–$r_1$) of the reference block Bp0 and pixel values c ($c_0$–$C_{34}$) of all candidate blocks (12 candidate blocks) Bb0 within the search range E0 for the reference block Bp0, based on equation (1), are used to determine the sums of the absolute values of the differences $D_{i,j}$ ($0 \le i < 2$, $0 \le j < 3$).

Then, as a second step, from all of the sums of the absolute values of the differences $D_{i,j}$ ($0 \le i < 2$, $0 < j < 3$) as found in the first step, the least sum of the absolute values of the differences $\min D_{i,j}$ according to equation (2) is determined to thereby determine the motion vector $MV_{x,y}$. Meanwhile, if the evaluation value is the sum of the differences squared, it suffices to substitute a term in the form of $(r-c)^2$ for each term of the absolute value of the difference in each of the above equations. In the interest of brevity, no detailed description will be made of those calculations.

As a third step, calculations similar to the above-mentioned first step, based on equation (1), are performed on the pixel values ($r_a$–$r_1$,) of a reference block Bp1 adjacent to the reference block Bp0 and pixel values ($c_{21}$~$c_{55}$) of all candidate blocks (12 candidate blocks) Bb1 within the search range E1 for the reference block Bp1, to determine the sums of the absolute values of the differences $D'_{i,j}$ ($0 \leq i<2$, $0 \leq j<3$).

Then, as the fourth step, from all of the sums of the absolute values of the differences $D'_{i,j}$ ($0 \leq i<2$, $0 \leq j<3$), as determined in the first step, the least sum of the absolute values of the differences $minD'_{i,j}$ according to the equation (2) is used as the motion vector $MV_{x,y}$.

Finally, as a fifth step, the above sequence of operations is performed on all of the reference blocks Bp of the current frame Fp to determine the motion vectors $MV_{x,y}$.

The above-described operations for detecting the motion vector are realized using a circuit arrangement as shown in FIGS. 3, 4 and 5.

FIG. 3 shows a conventional motion vector detection circuit, that is, a processing circuit for detecting the motion vector, in its entirety. In this figure, the processing circuit consists of a plurality of processing units (PEs) 10 to 21, a plurality of registers (Reg) for storage of pixel values 22 to 38, and a plurality of multiplexer-registers for storage of pixel values (M&R) 39 to 44, interconnected with one another.

Referring to FIG. 3, the pixel values r of the reference block Bp are supplied to a terminal 1 so as to be supplied to the serially connected processing units 10 to 21. The pixel values c of the upper-half candidate blocks Bb within the search range E, for example, are supplied to a terminal 2 so as to be supplied to an input terminal of a first-stage register 22 of the serially connected registers 22 to 25 for sequential storage of the pixel values in the registers 22 to 25.

The outputs of the registers 22 to 25 are supplied to associated processing units 10 to 13 of the processing units 10 to 21. An output of the processing unit 13 is supplied to an input terminal of a first-stage register 30 of the serially connected registers 30 to 32 for sequential storage of pixel values in the registers 30 to 32. The outputs of the registers 30 to 32 for storage of pixel values are supplied to associated processing units 15 to 17 of the processing units 10 to 21.

The output of processing unit 17 of the processing units 15 to 17 is supplied to an input terminal of the first-stage 33 of the serially connected registers 33 to 35 for sequential storage of pixel values in the registers 33 to 35. The outputs of the registers 33 to 35 are supplied to associated processing units 19 to 21 of the processing units 10 to 21.

The pixel values c of, for example, the lower-half candidate blocks Bb within the search range E are supplied to a terminal 3 so as to be supplied to an input terminal of the first-stage 26 of the serially connected registers 26 to 29 for sequential storage therein of pixel values in the registers 26 to 29. The output of the register 27 of the registers 26 to 29 is supplied to a register 36 for storage of a pixel value. The output of the register 28 is supplied to an input terminal of a multiplexer-register 39 for storage of a pixel value, the other input terminal of which is supplied with an output of the register 36, while an output of the register 29 is supplied to an input terminal of a multiplexer-register 40 for storage of pixel values, the other input terminal of which is supplied with an output of the multiplexer-register 39.

The output of the multiplexer-register 40 for storage of a pixel value is supplied to an input terminal of processing unit 10 of the processing units 10 to 21. The output of the processing unit 10 is supplied to the next processing unit 11 and to an input terminal of a register 37 for storage of a pixel value. The output of the register 37 is supplied to an input terminal of a multiplexer-register 41 for storage of a pixel value, the other input terminal of which is supplied with an output of the processing unit 11. The output of the register 41 is supplied to an input terminal of a multiplexer-register 42 for storage of pixel values, the other input terminal of which is supplied with an output of the processing unit 12. The output of the processing unit 13 is supplied to the register 30 for storage of a pixel value and to the processing unit 14.

The output of the processing unit 14 is supplied to the next processing unit 15 and to an input terminal of a register 38 for storage of a pixel value. The output of the register 38 is supplied to an input terminal of a multiplexer-register 43 for storage of a pixel value, the other input terminal of which is supplied with an output from the processing unit 15. The output of the multiplexer-register 43 is supplied to an input terminal of the multiplexer-register 44 for storage of a pixel value, the other input terminal of which is supplied with an output from the processing unit 16. The output of the processing unit 17 is supplied to the register 33 for storage of a pixel value and to the processing unit 18.

Each of the processing units 10 to 21 shown in FIG. 3 are constructed as shown in FIG. 4. In FIG. 4, outputs of the other processing units or outputs of the registers for storage of pixel values of FIG. 3 are supplied to a terminal 51, while outputs of the other processing units or outputs of the multiplexer-registers for storage of the pixel values shown in FIG. 3 are supplied to a terminal 55. The input signals supplied to the terminals 51, 55 are multiplexed by a multiplexer (MPX) 57 before being supplied to a register 58 for storage of a pixel value. The output of the register 58 is available at output terminals 52 and 54, and is supplied to an input terminal of a processor 59 for calculating an absolute value of a difference ($|r-c|$). The other input terminal of the processor 59 is supplied with the pixel value r of the reference block Bp via terminal 1 of FIG. 3 and corresponding terminal 53 in FIG. 4. The output of the processor 59 is supplied to an accumulator (ACC) 60, from which an accumulated output corresponding to the sum of the absolute values of the differences $D_{i,j}$ is available at terminal 56.

Each of the multiplexer-registers for storage of pixel values 39 to 44 shown in FIG. 3 is constructed as shown in FIG. 5. In this figure, an output of the register for storage of pixel values or the multiplexer-register for storage of a pixel value of the preceding stage shown in FIG. 3 is supplied to a terminal 72, while an output of the associated register for storage of a pixel value or the processing unit shown in FIG. 3 is supplied via the terminal 54 shown in FIG. 4. The input signals supplied to the terminals 72, 73 are multiplexed by a multiplexer 76 before being supplied to a register 76 for storage of a pixel value. The output of the register 76 is supplied to a downstream circuit via the terminal 71.

A control system for achieving motion vector detection using the circuits shown in FIGS. 3 to 5 will now be explained with reference to FIG. 6 showing control timing for motion vector detection using the circuits shown in FIGS. 3 to 5.

As shown in FIG. 6, the pixel values r of the reference blocks Bp are given to all of the processing units per each clock cycle. That is, each processing unit performs an arithmetic operation for the same pixel value r of a given reference block Ep during a given clock cycle.

The pixel values c of the candidate block Bb are classified into those belonging to an upper half region and those belonging to a lower half region of the search range E so as to be sequentially supplied to the input terminals 2, 3 shown in FIG. 3. The pixel values c of the candidate block Bb are also supplied, per each clock cycle, to a downstream pixel value storage register, on the condition that the pixel values c are transmitted to the pixel value storage register 58 of the processing unit shown in FIG. 4 per every four clock cycles. In this manner, each processing unit performs the arithmetic operation on the different pixel values c of the candidate block Bb during a given clock cycle, as shown in FIG. 6.

In the conventional processing circuit, the sums of the absolute values of the differences are unanimously output from the respective processing units at an interval of 12 clock cycles at the output terminal 56 shown in FIG. 3 as a result of the above-described control operation. The motion vector $MV_{x,y}$ is found by comparing the magnitudes of these sums $D_{i,j}$ to one another. It is noted that, since the accumulator 60 shown in FIG. 4 immediately starts accumulation of the sums of the differences of the absolute values $D_{i,j}$ for the next reference block Bp during the next clock cycle, it is necessary to store the sums of the differences of the absolute values $D_{i,j}$ once in respective registers before proceeding to the comparison operation described above.

With the above-depicted processing circuit for performing the above-described conventional motion vector detecting operation, a large number of pixel value storage registers are required for holding the pixel values c of the candidate blocks Bb, as shown in FIGS. 3 to 5.

The sums of the differences of the absolute values $D_{i,j}$ or the sums of the differences squared are unanimously output from the respective processing units, as mentioned above, so that it becomes necessary to provide one such register for each of the processing units for storing the sums of the differences of the absolute values $D_{i,j}$ or the sums of the differences squared, resulting in an increase in the number of hardware items.

Moreover, a processing word length equal to the input word length (output word length from the processor for calculating the absolute values of the differences or the processor for calculating the differences squared)×$\log_2$ (the number of the processing units) must be provided for each accumulator of each of the processing units. For example, for an input word length of 8 bits and 256 processing units, a processing word length of 16 bits is required for each accumulator, resulting in an increase in the hardware scale.

In addition, in connection with the circuit controlling operation, it is necessary to carry out an initializing operation of previously storing the pixel values c of the candidate block Bb in the pixel value storage registers when starting the motion vector detecting operation, that is, when detecting the motion vector for the leading reference block in a given frame.

OBJECT AND SUMMARY OF THE INVENTION

It is therefore an object of the present invention to provide a processing circuit in which the hardware scale may be diminished and the necessity for performing the initializing operation before starting the motion vector detecting operation may be eliminated.

In view of the above object, the present invention provides a first processing circuit for performing full searching by a block-matching method for detecting the motion vector, with the block size of a reference block of the current frame being M×N pixels and with the number of candidate blocks of a previous frame being M×N. The first processing circuit includes M×N processing units each of which is adapted for accumulating absolute values of the differences between the pixel values of the reference block of the current frame on one hand and the pixel values of a candidate block of an odd column of the previous frame and the pixel values of a candidate block of an even column of the previous frame, whichever is selected as a result of multiplication or selection by switching, to find the sum of the absolute values of the differences as an evaluation value represented by such difference. These units are arrayed in a M×N matrix configuration and interconnected so as to be supplied with the pixel values of the reference block and the candidate blocks in a pre-set sequence to detect the motion vector.

The processing unit of the first processing circuit comprises a register for sequentially storing the pixel values of the current frame, a multiplexer for multiplexing the pixel values of one of the candidate blocks of an odd column of a previous frame which is under consideration and the pixel values of one of the candidate blocks of an even column of the previous frame which is under consideration, a processor for calculating an absolute value of the difference between an output of the register and an output of the multiplexer, and an accumulator for accumulating outputs of the processors for finding the sum of the absolute values of the differences.

The present invention also provides a second processing circuit including M×N processing units each of which is adapted for accumulating squared values of the differences between the pixel values of the reference block of the current frame on one hand and the pixel values of one of the candidate blocks of an odd column of the previous frame under consideration and the pixel values of one of the candidate blocks of an even column of the previous frame under consideration, whichever is selected as a result of multiplication or selection by switching, to find the sum of the squared values of the differences as an evaluation value represented by such difference. These units are arrayed in a M×N matrix configuration and interconnected so as to be supplied with the pixel values of the reference block and the candidate blocks in a pre-set sequence to detect the motion vector.

The processing unit of the second processing circuit comprises a register for sequentially storing the pixel values of the current frame, a multiplexer for multiplexing the pixel values of one of the candidate blocks of an odd column of a previous frame under consideration and the pixel values of one of the candidate blocks of an even column of the previous frame under consideration, a processor for calculating a squared value of the difference between an output of the register and an output of the multiplexer, and an accumulator for accumulating outputs of the processors for finding the sum of the absolute values of the differences.

That is, the first and second processing circuits according to the present invention comprises a processing circuit for detecting the motion vector by full searching by the block-matching method, with the block size of the reference block being M×N and the number of candidate blocks also being M×N. Each of the first and second processing circuits includes a M×N number of processing units each having a register, a multiplexer, a processor for calculating an absolute value of a difference or a squared value of a difference and an accumulator. These processing units are arrayed and interconnected in a M×N matrix configuration for detecting the motion vector.

The third processing circuit includes M×N processing units each of which is adapted for accumulating absolute values of the differences between the pixel values of the reference block of the current frame on one hand and the pixel values of one of the candidate blocks of an odd column of the previous frame under consideration and the pixel values of one of the candidate blocks of an even column of the previous frame under consideration, whichever is selected as a result of multiplication or selection by switching, to find the sum of the absolute values of the differences as an evaluation value represented by such difference. These units are arrayed and interconnected in a M×N matrix configuration while outputs of the processing units are connected in a pipeline configuration via additive circuits so that the pixel values of the reference block and the candidate blocks are processed in a pre-set sequence for calculating the absolute values of the differences to detect the motion vector.

The processing unit of the third processing circuit comprises a register for sequentially storing the pixel values of the current frame, a multiplexer for multiplexing the pixel values of one of said candidate blocks of an odd column of a previous frame which is under consideration and the pixel values of one of said candidate blocks of an even column of the previous frame which is under consideration, and a processor for calculating an absolute values of the differences between an output of the register and an output of the multiplexer.

The fourth processing circuit includes M×N processing units each of which is adapted for accumulating squared values of the differences between the pixel values of the reference block of the current frame on one hand and the pixel values of one of the candidate blocks of an odd column of the previous frame under consideration and the pixel values of one of the candidate blocks of an even column of the previous frame under consideration, whichever is selected as a result of multiplication or selection by switching, to find the sum of the squared values of the differences as an evaluation value represented by such difference. These units are arrayed and interconnected in a M×N matrix configuration, while the outputs of the processing units are connected in a pipeline configuration via additive circuits so that the pixel values of the reference block and the candidate blocks are processed in a pre-set sequence for calculating the squared values of the differences to detect the motion vector.

The processing unit of the fourth processing circuit comprises a register for sequentially storing the pixel values of the current frame, a multiplexer for multiplexing the pixel values of one of said candidate blocks of an odd column of a previous frame which is under consideration and the pixel values of one of said candidate blocks of an even column of the previous frame which is under consideration, and a processor for calculating an squared value of the differences between an output of the register and an output of the multiplexer.

That is, the third and fourth processing circuits according to the present invention comprise a processing circuit for detecting the motion vector by full searching using the block-matching method, with the block size of the reference block being M×N and the number of candidate blocks also being M×N. Each of the third and fourth processing circuits includes a M×N number of processing units each having a register, a multiplexer, and a processor for calculating an absolute value of a difference or a squared value of a difference. These processing units are arrayed and interconnected in a M×N matrix configuration, while the outputs of the processing units are connected in a pipeline configuration via additive circuits so that the pixel values of the reference block and the candidate blocks are processed in a pre-set sequence for calculating the absolute values or squared values of the difference to detect the motion vector.

Meanwhile, a memory may be provided in each of the M×N processing units of each of the first to fourth processing units of the present invention for storing the sums of the absolute values of the differences or the sums of the differences squared between the reference block and the totality of the candidate blocks.

With the first and second processing circuits according to the present invention, the sums of the absolute values of the differences or the sums of the differences squared may be calculated by supplying the pixel values of the reference block or the candidate blocks in a pre-set sequence, without the necessity of storing the pixel values of the candidate blocks in the registers in the processing units. In addition, it is possible for each processing unit to output the sum of the absolute values of the differences or the sum of the differences squared during each clock cycle.

With the third and fourth processing circuits according to the present invention, the sums of the absolute values of the differences or the sums of the differences squared may be calculated by processing the pixel values of the reference block or the candidate blocks in a pre-set sequence for calculating the absolute values of the differences or the differences squared, without the necessity of storing the pixel values of the candidate blocks in the registers in the processing units. Moreover, it is possible for the processing circuit to output the sum of the absolute values of the differences or the sum of the differences squared during each clock cycle.

In this manner, according to the present invention, by providing a M×N number of processing units, each having a register for storing a pixel value, a multiplexer, a processor for calculating an absolute value or a squared value of a difference, and an accumulator, with the block size of the reference block being M×N and the number of candidate blocks also being M×N, arraying and interconnecting the processing units in a M×N matrix configuration and by supplying the pixel values of the reference blocks and the candidate blocks in a pre-set sequence, or by providing a M×N number of processing units, each having a register for storing a pixel value, a multiplexer and a processor for calculating an absolute value or a squared value of a difference, with the block size of the reference block and the number of candidate blocks being as given above, arraying and interconnecting the processing units in a M×N matrix configuration, connecting outputs of the processing units in a pipeline configuration via additive nodes and by supplying the pixel values of the reference blocks and the candidate blocks in a pre-set sequence to the processor for calculating an absolute value or a squared value of a difference, the sum of the absolute values of the differences or the sum of the differences squared may be calculated without storing the pixel values of the candidate blocks in the registers. Moreover, it is possible for the processing circuit to output the sum of the absolute values of the differences or the sum of the differences squared during each clock cycle. Thus it is possible with the processing circuit according to the present invention to decrease the number of hardware items as well as to eliminate the initializing operation at the time of starting the operation of detecting the motion vector.

BRIEF DESCRIPTION OF THE DRAWINGS

FIG. 1 illustrates the principle of motion vector detecting operations.

FIG. 2 illustrates a motion vector detecting operation for a reference block size of 3×4 pixels and a candidate block size of 3×4.

DESCRIPTION OF THE PREFERRED EMBODIMENTS

Figure 3:
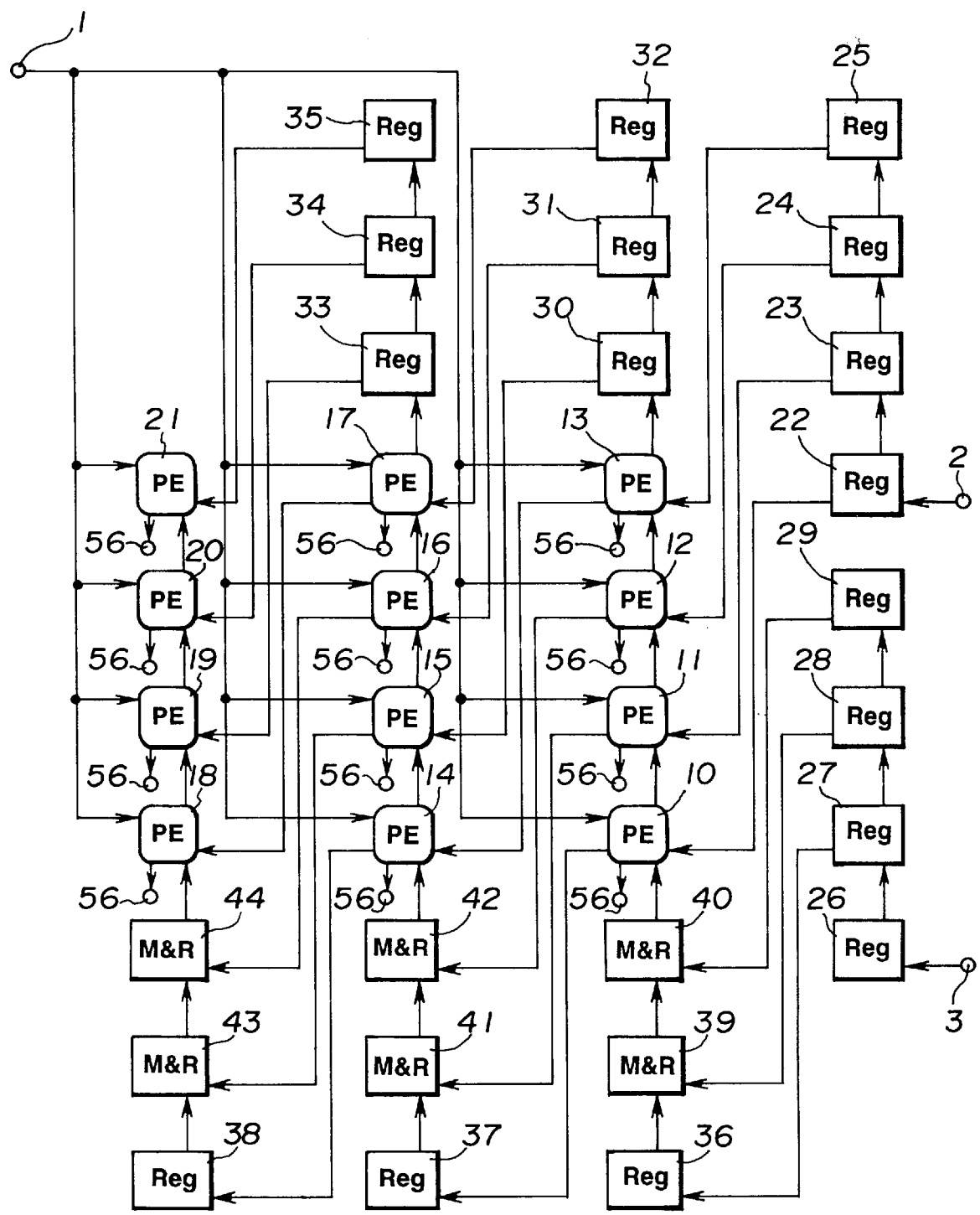
FIG. 3 is a block circuit diagram showing the construction of a processing circuit for carrying out the conventional motion vector detecting operation.
Figure 4:
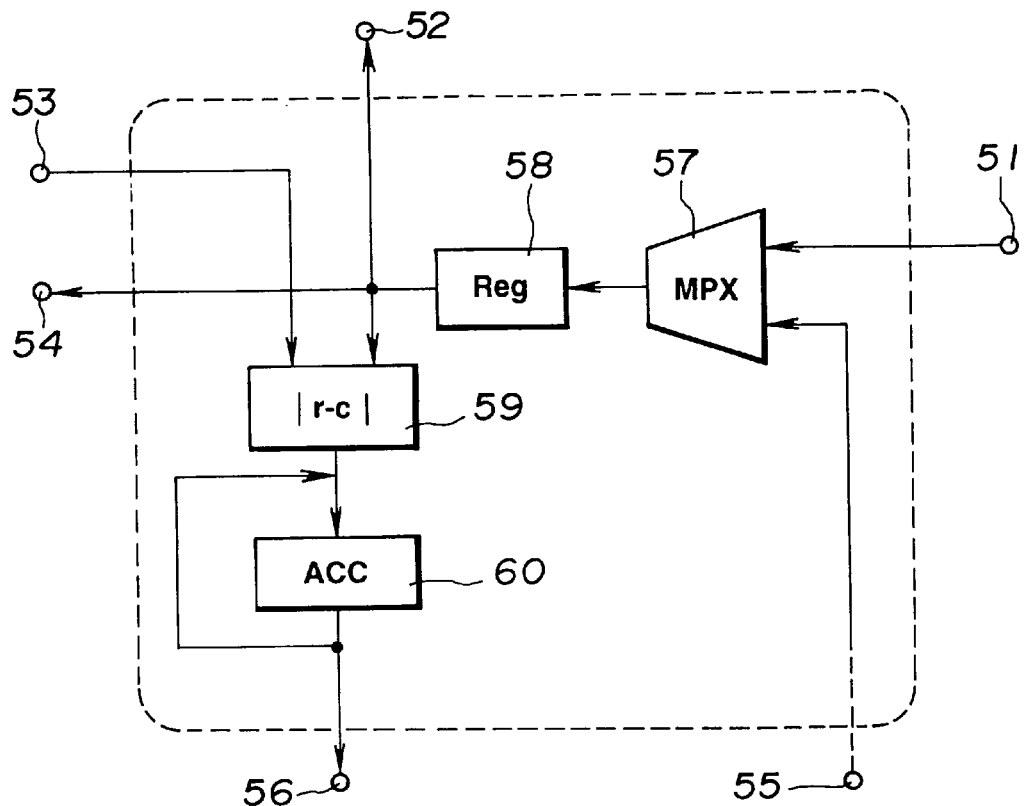
FIG. 4 is a block circuit diagram showing an arrangement of a processing unit of the conventional processing circuit of FIG. 3.
Figure 5:
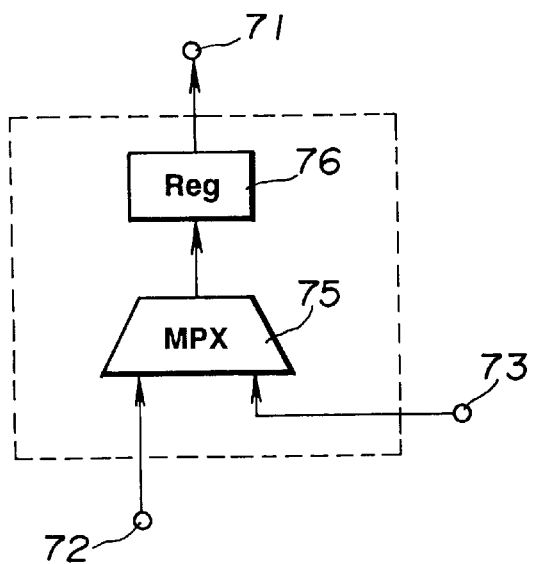
FIG. 5 is a block circuit diagram showing an arrangement of a multiplexer-pixel value storage register of the conventional processing circuit of FIG. 3.
Figure 6:
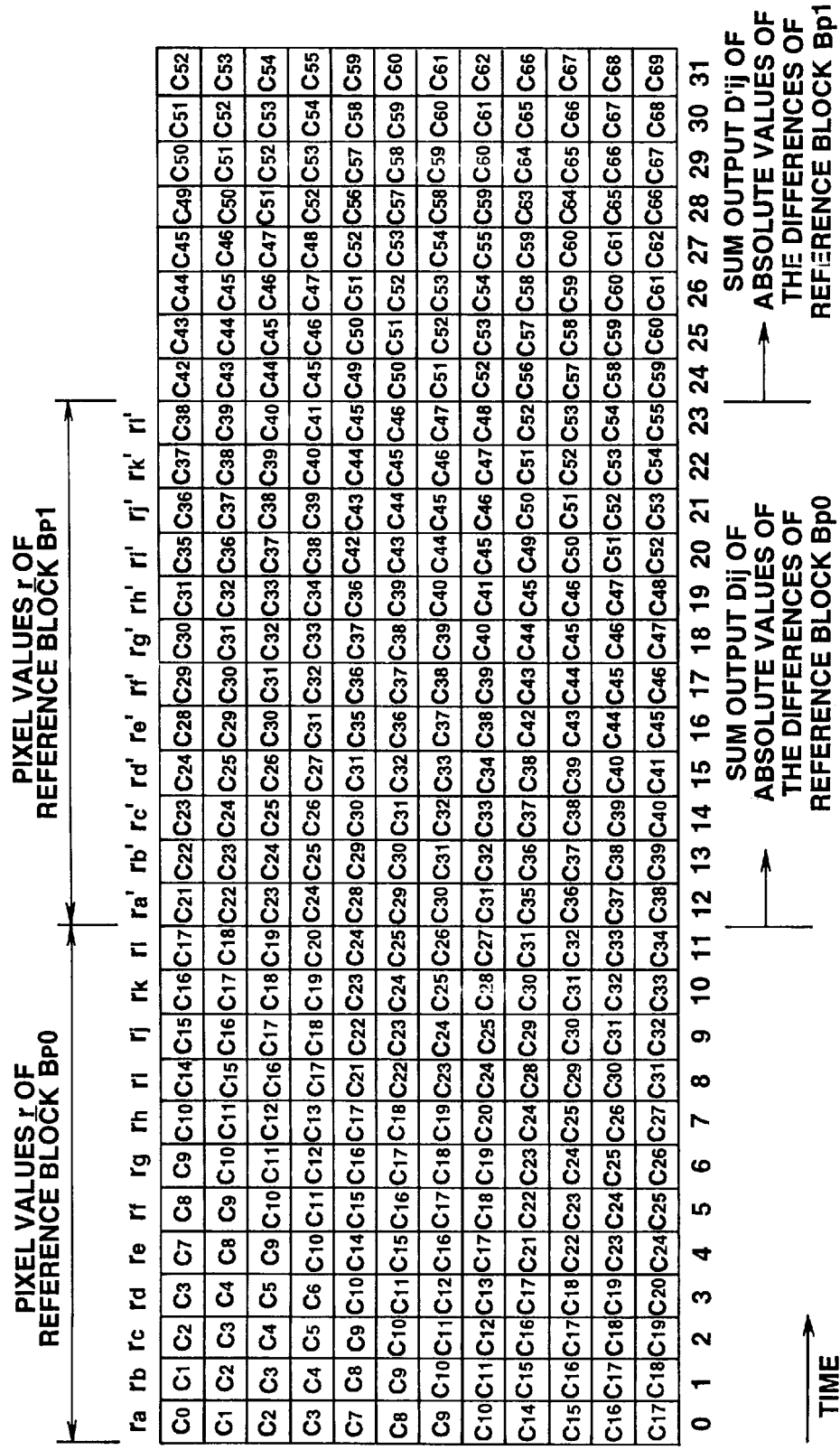
FIG. 6 illustrates the timing control of the conventional motion vector detecting operation.

Referring to the drawings, a processing circuit according to an embodiment of the processing circuit according to the present invention will now be explained in detail.

Figure 7:
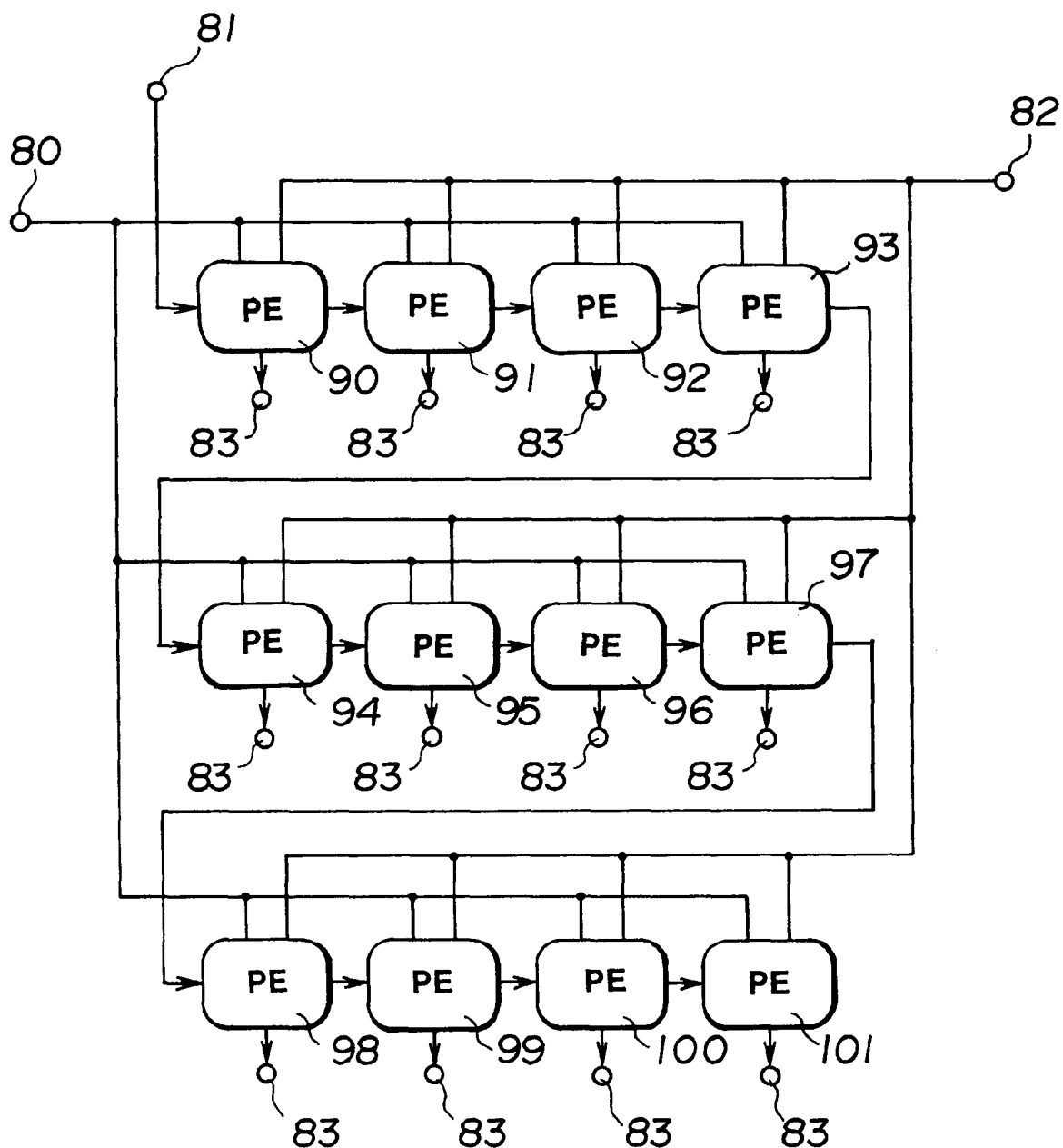
FIG. 7 is a block circuit diagram illustrating an embodiment of the present invention including first and second processing circuits for carrying out motion vector detection.

The first and second processing circuits of a first embodiment is adapted for detecting a motion vector by performing full search using a block-matching method for a block size of M×N pixels, in the exemplary embodiment 3×4 pixels, of a reference block Bp of a current frame Fp, and of a number of candidate blocks Bb of a previous frame Fb equal to M×N, herein 3×4, as shown in FIG. 7. Each of the first and second processing circuits includes M×N processing units (PEs), herein 3×4 or 12 processing units, bearing reference numerals 90 to 101, each processing unit PE being capable of calculating an absolute value of the difference (or a squared difference) as an evaluation value, represented by the difference between a given pixel value r of the reference block Bp of the current frame Fp and a pixel value c of a candidate block Bb of an odd column of the previous frame Fb and a pixel value c of the candidate block Bb of an even column of the previous frame Fb, whichever is supplied to the processing unit as a result of multiplexing or selection by switching. The absolute values of the differences, or the differences squared, from the processing units are accumulated to sum of the absolute values of the differences Di,j or a sum of the differences squared, respectively, as a sum of the evaluation values. The processing units 90 to 101 are arrayed in a matrix of M×N, herein 3×4, and interconnected with one another. The pixel values r of the reference block Bp and the pixel values c of the candidate blocks Bb are supplied in a pre-set sequence to the matrix circuit for detecting the motion vector $MV_{x,y}$.

Figure 8:
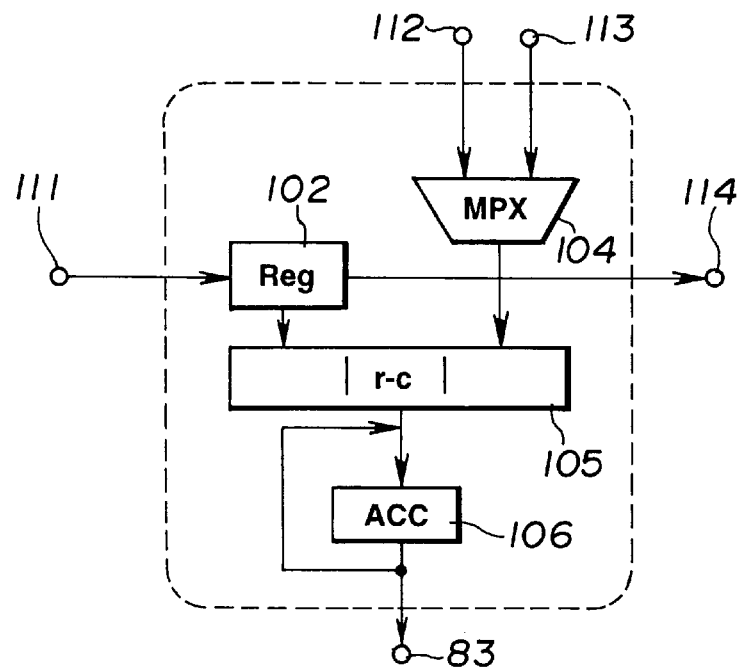
FIG. 8 is a block circuit diagram illustrating a first embodiment of a processing unit of the first and second processing circuits, according to the embodiment of FIG. 7, for determining the sum of the absolute values of the differences.

Referring to FIG. 8, each of the processing units 90 to 101 of the first and second processing circuits comprises a register 102 for sequentially storing the pixel values r of the reference block Bp of the current frame Fp, a multiplexer 104 for multiplexing (or suitably selecting by switching) the pixel value c of the candidate block Bb of an odd column of the previous frame Fb or the pixel value c of the candidate block Bb of an even column of the previous frame Fb, a processor 105 for calculating an absolute value of a difference between outputs of the register 102 and the multiplexer 104, and an accumulator 106 for accumulating the outputs of the processor 105 to thereby sum of the absolute values of the differences $D_{i,j}$.

Figure 9:
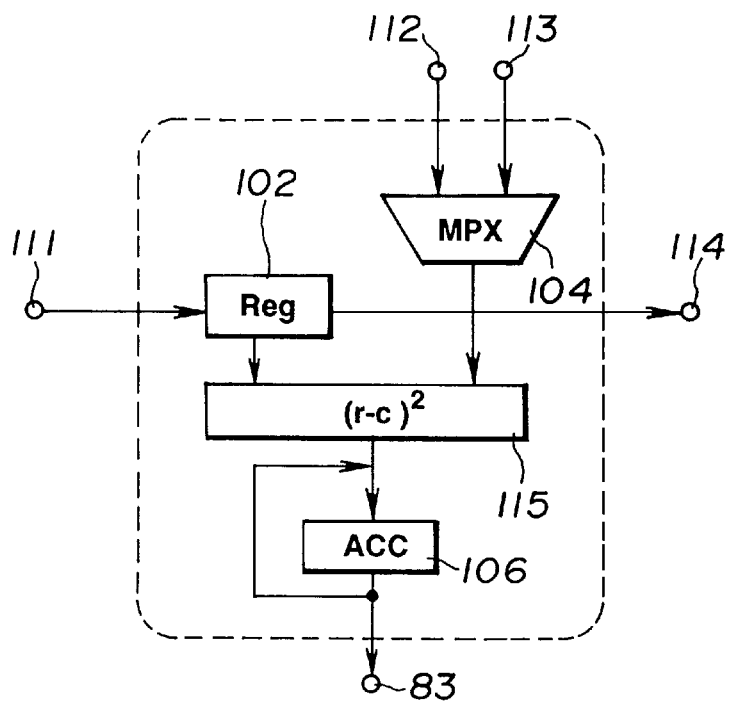
FIG. 9 is a block circuit diagram illustrating a second embodiment of a processing unit of the first and second processing circuits, according to the embodiment of FIG. 7, for determining the sum of the squared values of the differences.

Alternatively, as shown in FIG. 9, each of the processing units 90 to 101 of the first and second processing circuits may comprise a register 102 for sequentially storing the pixel values r of the reference block Bp of the current frame Fp, a multiplexer 104 for multiplexing (or suitably selecting by switching) the pixel value c of the candidate block Bb of an odd column of the previous frame Fb or the pixel value c of the candidate block Bb of an even column of the previous frame Fb, a processor 115 for calculating a squared value of a difference between outputs of the register 102 and the multiplexer 104, and an accumulator 106 for accumulating the outputs of the processor 115 to thereby sum the squared values of the differences.

Referring to FIGS. 7 to 10, the first and second processing circuits embodying the present invention will now be explained. In connection with this embodiment, the circuit arrangement and the controlling system are explained with reference to the example of motion vector detection explained above in connection with the conventional circuit arrangement.

In the present embodiment, motion vector detection is performed by the circuit arrangements shown in FIGS. 7 to 9. FIG. 7 illustrates a first embodiment of a processing circuit for detecting the motion vector, in which the processing units 90 to 101 are arrayed and interconnected in a 3×4 matrix configuration. Referring to FIG. 7, the pixel values c of the candidate block Bb of an odd column of the previous frame Fb are supplied to a terminal 80 and thereby to one of the input terminals of the processing units 90 to 101. The pixel values c of the candidate block Bb of an even column of the previous frame Fb are supplied to a terminal 82 and thereby to the other input terminals of the processing units 90 to 101. The pixel values r of the reference block Bp are supplied via a terminal 81 to an initial-stage unit 90 of the processing units 90 to 101 connected in tandem and thereby to the processing units 91 to 101 in order. The sum of the absolute values of the differences $D_{i,j}$, or the sum of differences squared, is output at a terminal 83 of each of the processing units 90 to 101.

FIGS. 8 and 9 illustrate two examples of the internal structures of the processing units 90 to 101. The following explanation will primarily refer to FIG. 8 with references to the embodiment of FIG. 9 in parentheses. Each of the processing units 90 to 101 comprises a multiplexer 104, a pixel value storage register 102, a processor for calculating the absolute values of the differences 105 (or a processor 115 for calculating the differences squared in FIG. 9), and an accumulator 106 for finding the sum of the absolute values of the differences or the sum of the differences squared. In FIG. 8, the pixel value c of the candidate block Bb of an odd column of the previous frame Fb is supplied via terminal 80 of FIG. 7 to an input terminal 112, while the pixel value c of the candidate block Bb of an even column of the previous frame Fb is supplied via terminal 82 of FIG. 7 to an input terminal 113. These pixel values c are multiplexed (or suitably selected by switching) by the multiplexer 104 so as to be supplied to an input terminal of the processor 105 for calculating the absolute values of the differences (or to the processor 115 for calculating the differences squared in FIG. 9). The pixel value r of the reference block Bp from the terminal 81 shown in FIG. 7 or the pixel value r from a terminal 114 of the processing unit of the previous stage are supplied to a terminal 111. These pixel values r are supplied via the pixel value storage registers 102 to the other input terminal of the processor 105 for calculating the absolute values of the differences (or the processor 115 for calculating the differences squared in FIG. 9). In addition, the pixel values r are also supplied via the terminal 114 to the next stage processing unit. The output of the processor for calculating the sum of the absolute values of the differences or the processor for calculating the differences squared are transmitted to the accumulator (ACC) 106. An accumulated output of the accumulator 106 is transmitted via the terminal 83 as, for example, the sum of the absolute values of the differences $D_{i,j}$.

The control system for implementing the motion vector detection using the circuit arrangements shown in FIGS. 7 and 8 (or 9) is hereinafter explained with reference to the timing chart of FIG. 10, which illustrates control of motion vector detection using the circuits shown in FIGS. 7 and 8 (or 9).

Figure 10:
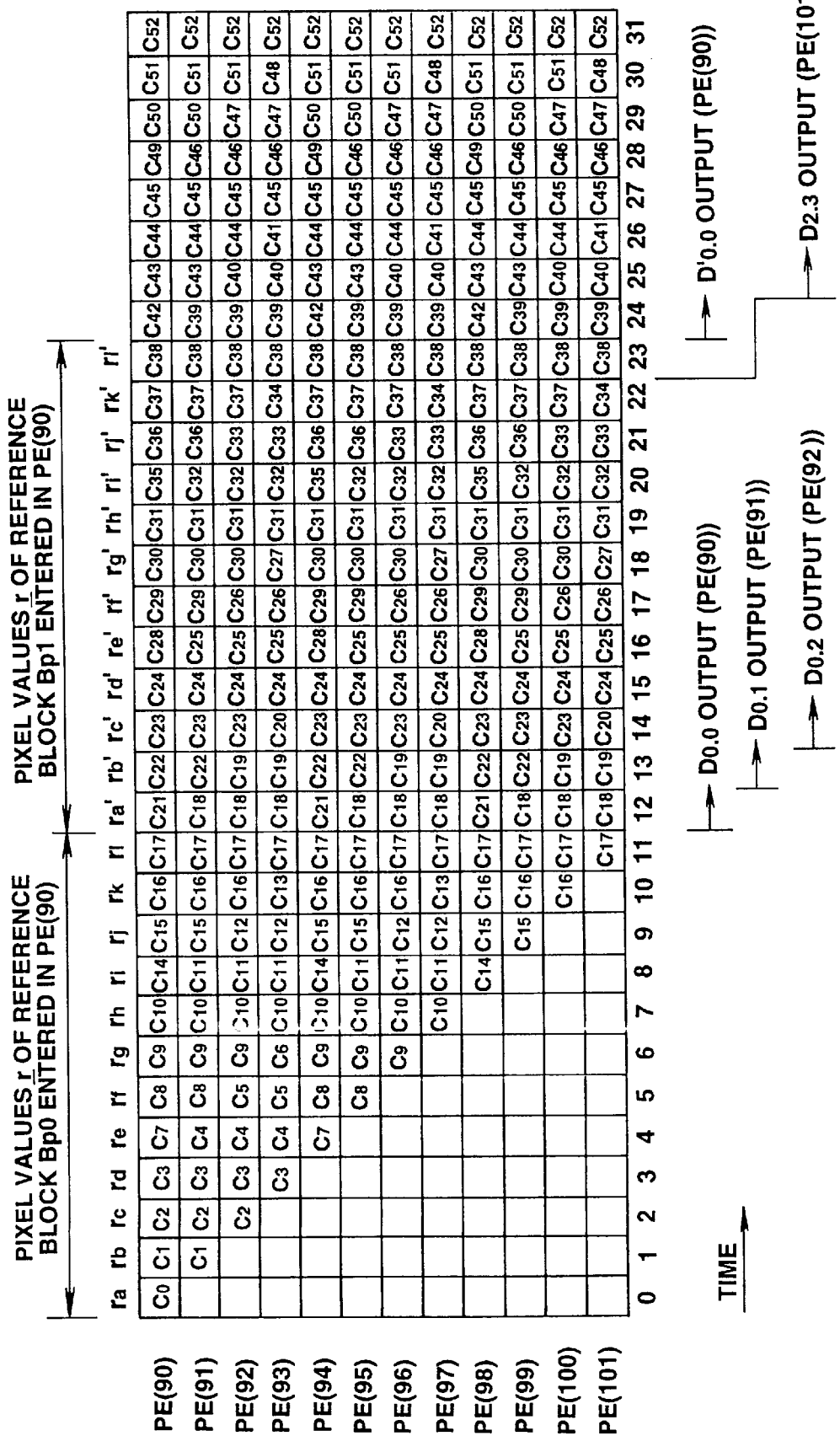
FIG. 10 illustrates the timing control for motion vector detecting operations, using the first and second processing circuits according to the embodiment of FIG. 7.

Referring to FIG. 10, the pixel values r of the reference block Bp are sequentially entered during each clock cycle in the pixel value storage register 102 of the initial-stage processing unit 90 shown in FIG. 7. The so-entered pixel values r of the reference block Bp are supplied over 12 clock cycles to all of the processing units 90 to 101 shown in FIG. 7. That is, as far as the pixel value r of the reference blocks Bp is concerned, the processing units perform processing operations on different pixel values.

The pixel values c of the candidate block Bb are sorted into two pixel value categories, namely even column pixel values and odd column pixel values, of the previous frame Fb, which are entered in a pre-set sequence via the two input terminals 80, 82 (as shown in FIG. 7) to the processing units 90 to 101. In the processing units 90 to 101, the multiplexer 104 suitably multiplex the two categories of the pixel values c so that the pixel values c of the candidate block Bb are transmitted in the sequence shown in FIG. 10. In this manner, the processing units 90 to 101 perform processing operations on one or two pixel values c during a given clock cycle, as shown in FIG. 10.

The accumulator 106 in each of the processing units 90 to 101 accumulates the outputs of the processor 105 for calculating the absolute values of the differences (or the processor 115 for calculating the differences squared in FIG. 9), to calculate the sum of the absolute values of the differences $D_{i,j}$ (or the sum of the differences squared in FIG. 9).

By performing the above-described control operation, the sum of the absolute values of the differences $D_{i,j}$ (or the sum of the differences squared for the embodiment shown in FIG. 9) is sequentially output from each of the processing units 90 to 101 during each clock cycle. The magnitudes of the sums of the absolute values of the differences $D_{i,j}$ or of the differences squared for the embodiment shown in FIG. 9, may be compared to one another to find the motion vector $MV_{x,y}$. It is noted that, since the accumulator 106 immediately starts accumulating the sums of the differences of the absolute values $D_{i,j}$, or the sums of the differences squared, it is necessary to store the sums of the differences of the absolute values $D_{i,j}$ (or the sums of the differences squared in FIG. 9) once in respective memories, not shown, before proceeding to comparison of the next reference block Bp during the next clock cycle, as described above.

Figure 11:
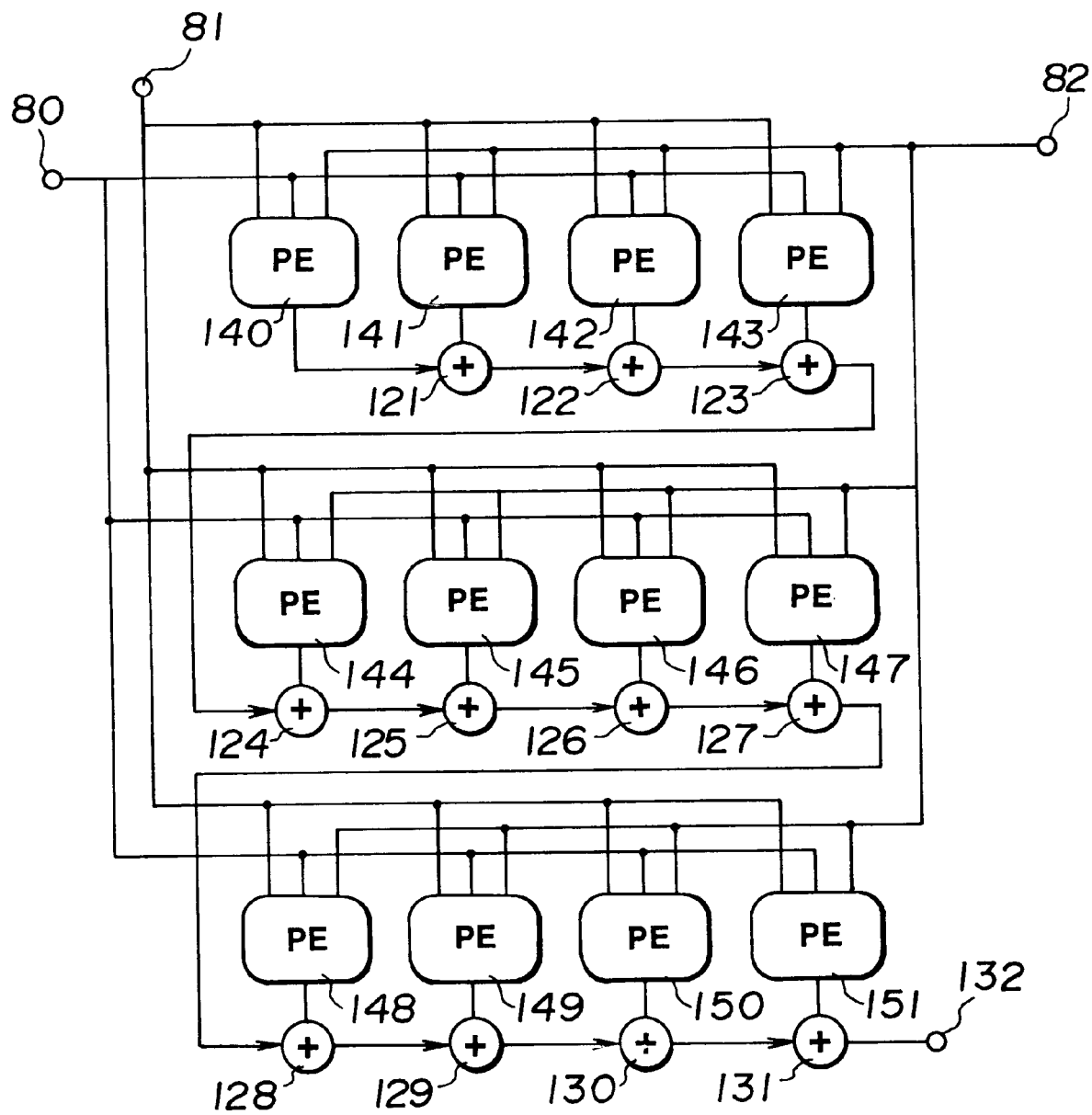
FIG. 11 is a block circuit diagram illustrating another embodiment of the present invention including third and fourth processing circuits for carrying out motion vector detection.

Referring now to FIG. 11, there are depicted third and fourth processing circuits, comprising an M×N number of processing units (PEs), herein 3×4 or 12 processing units, 140 to 151, for calculating an absolute value of the difference (or a squared difference) between a given pixel value r of the reference block Bp of the current frame Fp and a pixel value c of the candidate block Bb of an odd column of the previous frame Fb and a pixel value c of the candidate block Bb of an even column of the previous frame Fb, whichever is supplied to the processing unit as a result of multiplexing or switching. The processing units 140 to 151 are arrayed in a M×N (herein 3×4) matrix configuration. The outputs of these processing units 140 to 151 are connected in a pipeline (series) configuration via additive nodes 121 to 131. The pixel values r and c of the reference block Bp and the candidate blocks Bb are processed in a pre-set sequence for determining the sum of the differences of the absolute values for finding the motion vector $MV_{x,y}$.

Figure 12:
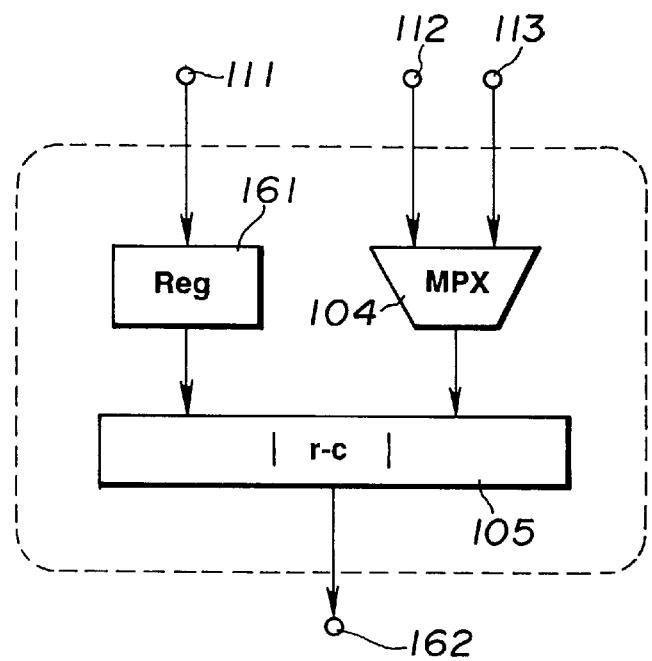
FIG. 12 is a block circuit diagram illustrating a first embodiment of the processing units of the third and fourth processing circuits, according to the embodiment of FIG. 11, for determining the sum of the absolute values of the differences.

Referring to FIG. 12, each of the processing units 140 to 151 comprises a register 161 for sequentially storing the pixel values r of the reference block Bp of the current frame Fp, a multiplexer 104 for multiplexing (or suitably selecting by switching) the pixel value c of the candidate block Bb of the odd column of the previous frame Fb or the pixel value c of the candidate block Bb of the even column of the previous frame Fb, and a processor 105 for calculating an absolute value of a difference between outputs of the register 161 and the multiplexer 104.

Figure 13:
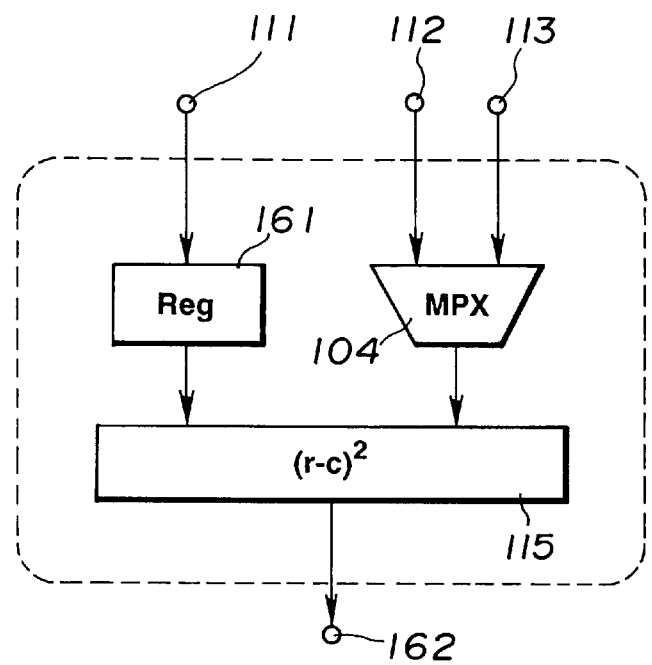
FIG. 13 is a block circuit diagram illustrating another embodiment of processing units of the third and fourth processing circuits, according to the embodiment of FIG. 11, for determining the sums of the squared values of the differences.

Alternatively, as shown in FIG. 13, each of the processing units 140 to 151 of the first and second processing circuits comprises a register 161 for sequentially storing the pixel values r of the reference block Bp of the current frame Fp, a multiplexer 104 for multiplexing (or suitably selecting by switching) the pixel value c of the candidate block Bb of the odd column of the previous frame Fb or the pixel value c of the candidate block Bb of the even column of the previous frame Fb, and a processor 115 for calculating a squared value of a difference between outputs of the register 161 and the multiplexer 104.

Referring now to FIGS. 11 to 14, a preferred embodiment of the third and fourth embodiments of the present invention will be explained in detail.

In this embodiment, the above-described motion vector detection is implemented by the circuit arrangements shown in FIGS. 11 to 13. FIG. 11 illustrates the third and fourth processing circuits for detecting the motion vector, in which the processing units 140 to 151 are arrayed in a 3×4 matrix configuration, with the outputs of the processing units 140 to 151 being connected in a pipeline configuration via the additive nodes 121 to 131. Referring to FIG. 11, the pixel values c of the candidate block Bb of an odd column of the previous frame Fb are supplied to the terminal 80 and thereby to one of the input terminals of the processing units 140 to 151. The pixel values c of the candidate block Bb of an even column of the previous frame Fb are supplied to a terminal 82 and thereby to the other input terminal of the processing units 140 to 151. The pixel values r of the reference block Bp are supplied via a terminal 81 to the processing units 140 to 151. The outputs of the processing units 140 to 151 are transmitted to the associated additive nodes 121 to 131, from which the sums of the absolute values of the differences $D_{i,j}$ or the sums of differences squared are output at terminal 132 of the processing circuit.

FIGS. 12 and 13 illustrate two examples of the internal structures of the processing units 140 to 151. The following explanation is made primarily with reference to FIG. 12 with references to FIG. 13 in parentheses. Each of the processing units 140 to 151 comprises a multiplexer 104, a pixel storage register 161, and a processor 105 for calculating the absolute values of the differences (or a processor 115 for calculating the differences squared in FIG. 13). In FIG. 12 (or FIG. 13), the pixel value c of the candidate block Bb of an odd column of the previous frame Fb is supplied via terminal 80 of FIG. 11 to a terminal 112, while the pixel value c of the candidate block Bb of an even column of the previous frame Fb is supplied via terminal 82 of FIG. 11 to a terminal 113. These pixel values c are multiplexed (or suitably selected by switching) by the multiplexer 104 so as to be supplied to an input terminal of the processor 105 for calculating the absolute values of the differences (or to the processor 115 for calculating the differences squared in FIG. 13). The pixel value r of the reference block Bp from the terminal 81 of FIG. 11 is supplied to a terminal 111. This pixel value r is supplied via a pixel value storage register 161 to the other input terminal of the processor 105 for calculating the absolute value of the difference (or the processor 115 for calculating the differences squared in FIG. 13). The output of the processor 105 for calculating the absolute value of the difference (or the processor 115 for calculating the differences squared in FIG. 13) is transmitted via a terminal 162.

The control system for implementing motion vector detection using the circuit arrangements in FIGS. 11 and 12 (or FIG. 13) is hereinafter explained with reference to the timing chart of FIG. 14, which illustrates control of motion vector detection using the circuits shown in FIGS. 11 and 12 (or FIG. 13).

Figure 14:
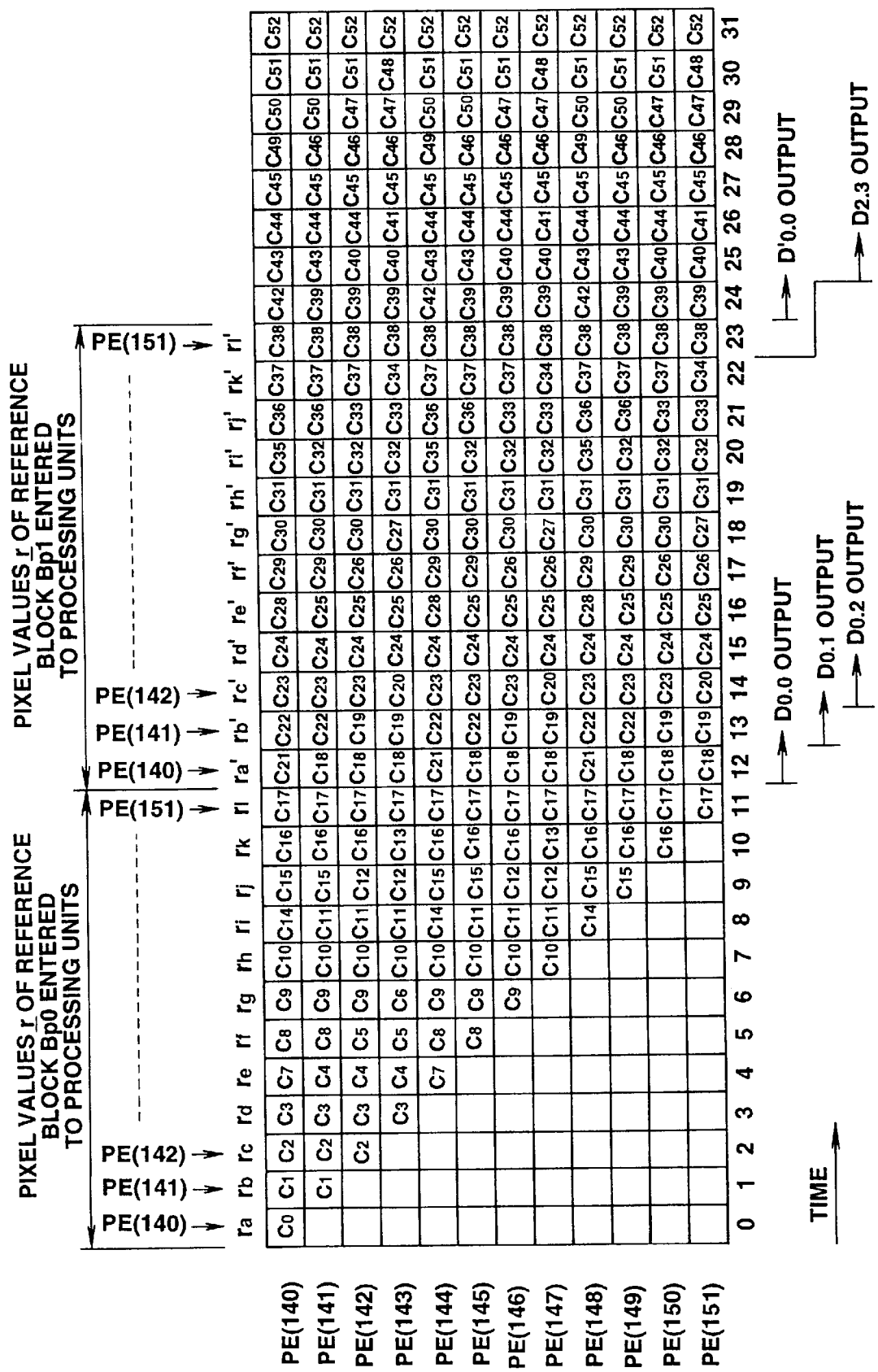
FIG. 14 illustrates the timing control of the motion vector detecting operation using the third and fourth processing circuits according to the embodiment of FIG. 11.

Referring to FIG. 14, the pixel values r of the reference block Bp are sequentially entered to the pixel value storage register 161 of each of the processing units 10 to 151. The pixel value storage register 161 holds the entered pixel value r of the reference block Bp for a duration of 12 clock cycles. Consequently, the processing units 140 to 151 perform the processing operation on the same pixel value r of the reference block Bp for a duration of 12 clock cycles. That is, the processing units perform processing operations on different pixel values during a given clock cycle.

The pixel values c of the candidate block Bb are sorted into two pixel value categories, namely even column pixel values and odd column pixel values of the previous frame Fb, which are entered in a pre-set sequence via the two input terminals 80, 82 (as shown in FIG. 11 to the processing units 140 to 151. In the processing units 140 to 151, the multiplexer 104 suitably multiplexes the two categories of the pixel values c so that the pixel values c of the candidate block Bb are transmitted in the sequence shown in FIG. 14. In this manner, the processing units 140 to 151 perform processing operations on one or two pixel values c during a given clock cycle, as shown in FIG. 14.

Outputs of the processor 105 for calculating the absolute value of the difference (or the processor 115 for calculating the differences squared in FIG. 13) are output at the terminal 162 and sequentially summed together using the additive nodes 121 to 131 connected in a pipeline configuration to determine the sum of the absolute values of the differences $D_{i,j}$ (or the sum of the differences squared).

By performing the above-described controlling operation, the sum of the absolute values of the differences $D_{i,j}$ (or the sum of the differences squared) is sequentially output at the output terminal 132 shown in FIG. 11 during each clock cycle. The magnitudes of these sums of the absolute values of the differences $D_{i,j}$ (or the differences squared) may be compared to one another to find the motion vector $MV_{x,y}$.

With the above-described processing circuits according to the first to fourth embodiments of the present invention, although it becomes necessary to provide registers for holding the pixel values r of the reference block Bp, the registers or multiplexers for holding the pixel values c of the candidate blocks Bb, which are necessarily employed in the conventional circuit arrangement, may be eliminated, with the result that the hardware scale as a whole may be diminished significantly. That is, comparison of the present embodiment with the conventional arrangement reveals that 23 pixel value storage registers and six multiplexers as used in the conventional arrangement which may be eliminated in the present embodiment. Moreover, the number of the hardware items that may be saved increases as the block size of the reference block Bp becomes larger, and the number of candidate blocks Bb becomes larger. For example, if the block size of the reference block Bp is 16×16 pixels and the number of the candidate blocks is 16×16, 496 pixel value storage registers and 224 multiplexers can be saved.

Moreover, with the processing circuit embodying the present invention, since the sum of the absolute values of the differences $D_{i,j}$ (or the sum of the differences squared) is output from each processing unit during each clock cycle, it becomes possible to employ a single-port memory, not shown, for storage of the sum of the absolute values of the differences $D_{i,j}$ (or the sum of the differences squared), with the result that the number of hardware items may be diminished as compared to that of the conventional circuit arrangement in which a register must be provided for each processing unit.

The initializing operation required with the conventional circuit arrangement at the time of starting the motion vector detection, that is at the time of motion vector detection in the leading reference block in a given frame, is eliminated with the present circuit arrangement, as a result of which the control circuit may be simplified in structure.

On the other hand, with the third and fourth processing circuits illustrated in FIGS. 11, 12 and 13, in which the additive nodes 121 to 131 are connected in a pipeline configuration so as to add the outputs of the processors 105 for calculating the absolute values of the differences (or the processors 115 for calculating the differences squared) of the processing units 140 to 151 to the outputs of the additive nodes of the upstream additive nodes in the pipelining connection, the word length employed for processing may, in general, be shorter than that employed in the processor of the conventional circuit. For example, if the input word length, that is the output word length from the processor 105 for calculating the absolute values of the differences (or the processor 115 for calculating the differences squared), is equal to 8 bits, and the number of the processing units is equal to 256, a processing word length of 16 bits is only required for the additive nodes of the final stage of the pipelining connection, while a processing word length of only 9 to 15 bits is required for the remaining additive nodes, depending on the output word length of the former stage additive nodes of the pipelining connection which is usually in the range of from 9 to 15 bits. Consequently, the number of the additive nodes connected in the pipeline configuration may be diminished as compared to the number of accumulators used in the conventional circuit arrangement.

Although the foregoing description of the first to fourth processing circuits of the above-described embodiments has been made in connection with motion vector detection for a block size having a reference block Bp of 3×4 pixels and for the number of the candidate blocks Bp equal to 3×4, it should be noted that the present invention may be applied to motion vector detection of a reference block Bp having an arbitrary block size, if the block size of the reference block Bp is equal to the number of the candidate blocks Bb.

What is claimed is:

1. A processing circuit for performing motion detection by dividing picture-based image signals into blocks, each block comprising a pre-set number of pixels and for searching an entire picture utilizing a block-matching method, wherein the block size of a reference block of the current picture comprises M×N pixels and the number of candidate blocks of a previous picture being M×N, said circuit comprising:

a plurality of processing units equal to the product of M×N, each of said processing units being adapted for calculating an evaluation value based on a difference between a pixel value of said reference block and a pixel value of a one of said candidate blocks under consideration, and for summing said evaluation values, said processing units being arrayed and interconnected in an M×N matrix configuration, the pixel values of said reference block and the pixel values of the candidate block under consideration being input to said processing units in a pre-set sequence to thereby detect a motion vector;

wherein each picture is a frame and wherein each processing unit comprises:
a register for sequentially storing the pixel values of a current frame,
a multiplexer for multiplexing pixel values of an odd column of a previous frame which is under consideration with the pixel values of an even column of the previous frame which is under consideration,
a processor for calculating an absolute value of the difference between an output of said register and an output of said multiplexer, and
an accumulator for accumulating outputs of said processor for summing the absolute values of the differences.

2. The processing circuit as claimed in claim 1 further comprising a memory associated with each of said M×N processing units for storing the sum of the absolute values of the differences between the reference block and the candidate blocks.

3. A processing circuit for performing motion detection by dividing picture-based image signals into blocks, each block comprising a pre-set number of pixels and for searching an entire picture utilizing a block-matching method, wherein the block size of a reference block of the current picture comprises M×N pixels and the number of candidate blocks of a previous picture being M×N, said circuit comprising:

a plurality of processing units equal to the product of M×N, each of said processing units being adapted for calculating an evaluation value based on a difference between a pixel value of said reference block and a pixel value of a one of said candidate blocks under consideration, and for summing said evaluation values, said processing units being arrayed and interconnected in an M×N matrix configuration, the pixel values of said reference block and the pixel values of the candidate block under consideration being input to said processing units in a pre-set sequence to thereby detect a motion vector;

wherein each picture is a frame and wherein each processing unit comprises:
a register for sequentially storing the pixel values of the current frame,
a multiplexer for multiplexing pixel values of an odd column of a previous frame which is under consideration with the pixel values of an even column of the previous frame which is under consideration,
a processor for calculating a squared value of the difference between an output of said register and an output of said multiplexer, and
an accumulator for accumulating outputs of said processor for summing the absolute values of the differences.

4. The processing circuit as claimed in claim 3 further comprising a memory associated with each of said M×N processing units for storing the sum of the squared values of the differences between the reference block and the candidate blocks.

5. A processing circuit for performing motion detection by dividing picture-based image signals into blocks, each block comprising a pre-set number of pixels and for searching for an entire picture utilizing a block-matching method, with the block size of a reference block of the current picture comprising M×N pixels and with the number of candidate blocks of a previous picture being M×N, said circuit comprising:

a plurality of processing units equal in number to the product M×N, each of said processing units being adapted for calculating an evaluation value based on a difference between a pixel value of said reference block and a pixel value of a one of said candidate blocks under consideration, said processing units being arrayed in a M×N matrix configuration, outputs of said processing units being connected in a pipeline configuration via a plurality of additive nodes, the pixel values of said reference block and the pixel values of said one candidate block under consideration being processed in a pre-set sequence to thereby detect a motion vector based on the evaluation valve of said difference, wherein each of said processing units includes a processor for calculating an absolute value of the difference between a pixel value of said reference block and a pixel value of the candidate block under consideration, the pixel value of said reference block and the pixel value of said candidate block under consideration being processed in a pre-set sequence to thereby determine the absolute value of the difference, wherein said picture is a frame, wherein said processing unit comprises:
a register for sequentially storing the pixel values of the current frame, and
a multiplexer for multiplexing the pixel values of an odd column of a previous frame which is under construction and the pixel values of an even column of the previous frame which is under consideration, and wherein said processor is for calculating an absolute value of the difference between an output of said register and an output of said multiplexer.

6. A processing circuit for performing motion detection by dividing picture-based image signals into blocks, each block comprising a pre-set number of pixels and for searching for an entire picture utilizing a block-matching method, with the block size of a reference block of the current picture comprising M×N pixels and with the number of candidate blocks of a previous picture being M×N, said circuit comprising:

a plurality of processing units equal in number to the product M×N, each of said processing units being adapted for calculating an evaluation value based on a difference between a pixel value of said reference block and a pixel value of a one of said candidate blocks under consideration, said processing units being arrayed in a M×N matrix configuration, outputs of said processing units being connected in a pipeline configuration via a plurality of additive nodes, the pixel values of said reference block and the pixel values of said one candidate block under consideration being processed in a pre-set sequence to thereby detect a motion vector based on the evaluation value of said difference, wherein each of said processing units includes a processor for calculating an absolute value of the difference between a pixel value of said reference block and a pixel value of the candidate block under consideration, the pixel value of said reference block and the pixel value of said candidate block under consideration being processed in a pre-set sequence to thereby determine the absolute value of the difference, wherein said picture is a frame, wherein said processing unit comprises:
   a register for sequentially storing the pixel values of a current frame, and
   a multiplexer for multiplexing the pixel values of an odd column of a previous frame which is under consideration and the pixel values of an even column of the previous frame which is under consideration, and wherein said processor is for calculating a squared value of the difference between an output of said register and an output of said multiplexer.

* * * * *

UNITED STATES PATENT AND TRADEMARK OFFICE
CERTIFICATE OF CORRECTION

PATENT NO. : 6,198,771 B1
DATED : March 6, 2001
INVENTOR(S) : Eiji Iwata

It is certified that error appears in the above-identified patent and that said Letters Patent is hereby corrected as shown below:

Column 16,
Line 64, replace "construction" with -- consideration --.

Signed and Sealed this

Seventh Day of May, 2002

Attest:

JAMES E. ROGAN
Attesting Officer   Director of the United States Patent and Trademark Office